United States Patent
Finke et al.

[11] 3,870,079
[45] Mar. 11, 1975

[54] THREE LEVER VALVE WITH RELIEF PORT

[76] Inventors: Harry P. Finke, 1306 Old Meadow Rd., Pittsburgh, Pa. 15241; Hugh B. Carr, 107 N. Heide Ln., McMurray, Pa. 15317; Carl D. Wilson, Boggs School Rd., Coraopolis, Pa. 15108

[22] Filed: Oct. 29, 1973

[21] Appl. No.: 410,828

Related U.S. Application Data
[62] Division of Ser. No. 296,823, Oct. 12, 1972, Pat. No. 3,804,124.

[52] U.S. Cl. ........................................... 137/630.14
[51] Int. Cl. .............................................. F16k 1/20
[58] Field of Search..... 137/630.14, 630.15, 630.19, 137/630.22; 251/228, 279, 298, 299

[56] References Cited
UNITED STATES PATENTS

| | | | |
|---|---|---|---|
| 1,850,094 | 3/1932 | Dean | 137/630.14 X |
| 3,128,792 | 4/1964 | Rule | 137/630.14 X |
| 3,669,405 | 6/1972 | Baum | 251/279 |

*Primary Examiner*—Robert G. Nilson
*Attorney, Agent, or Firm*—Webb, Burden, Robinson & Webb

[57] ABSTRACT

The valve includes a housing having an opening therethrough, a valve seat positioned about the opening and a valve disc positioned within the opening to engage the valve seat. The valve disc is operated through three layers which parallel move the valve disc from the valve seat initially and then rotate the disc through 90°. A relief port is positioned within the valve disc and a closure means for the relief port is connected to the central lever so that the relief port is opened prior to the opening of the valve disc.

1 Claim, 15 Drawing Figures

THREE LEVER VALVE WITH RELIEF PORT

This is a division of application Ser. No. 296,823, filed Oct. 12, 1972, now U.S. Pat. No. 3,804,124.

BACKGROUND OF THE INVENTION

Our invention is directed to valves and, more particularly, to three lever valves for gaseous media under high pressures.

Valves ranging in size up to 15 feet in diameter are used as control, shut-off or safety shut-offs for gaseous media under pressure often ranging to 100 lbs./sq. inch. Such valves are required in blast furnace stoves where the air blast for the blast furnace passes through the heated stove countercurrent to the passage of the gas. Because of the restricted areas in which such valves are installed, it is desirable to have as compact a structure as possible.

One such valve requires no superstructure and operates by means of three levers, the central one of which is driven and connected to a valve disc which cooperates with an appropriate seat in the valve body. When closed, the valve disc is in a vertical position parallel to the longitudinal axis of the valve body and aligned on the valve seat, thusly providing an absolute seal. A drive shaft is located outside of the valve body and at right angles to the longitudinal axis thereof. Initially the valve disc moves parallel from the valve seat and then through the action of the control arms or end levers, the disc is rotated through 90° to the open position.

In applications such as blast furnace stoves, valves of this type must operate under differential pressures, thereby creating problems in opening. By-pass valve systems have been employed to equalize the pressure but, of course, such systems require additional space and superstructure and are thusly self-defeating where space requirements are at a minimum.

SUMMARY OF THE INVENTION

Our invention provides a means of equalizing the pressure on opposing sides of the main valve disc within the confines of the valve itself. The relief port which equalizes the pressure is operable off of the drive mechanism of the valve and indeed is operated through the same main lever.

Our invention is a relief port built into the valve disc of a three lever valve in which the central lever operates both the valve disc and the closure means for the relief port.

DESCRIPTION OF THE PREFERRED EMBODIMENTS

Figure 1:
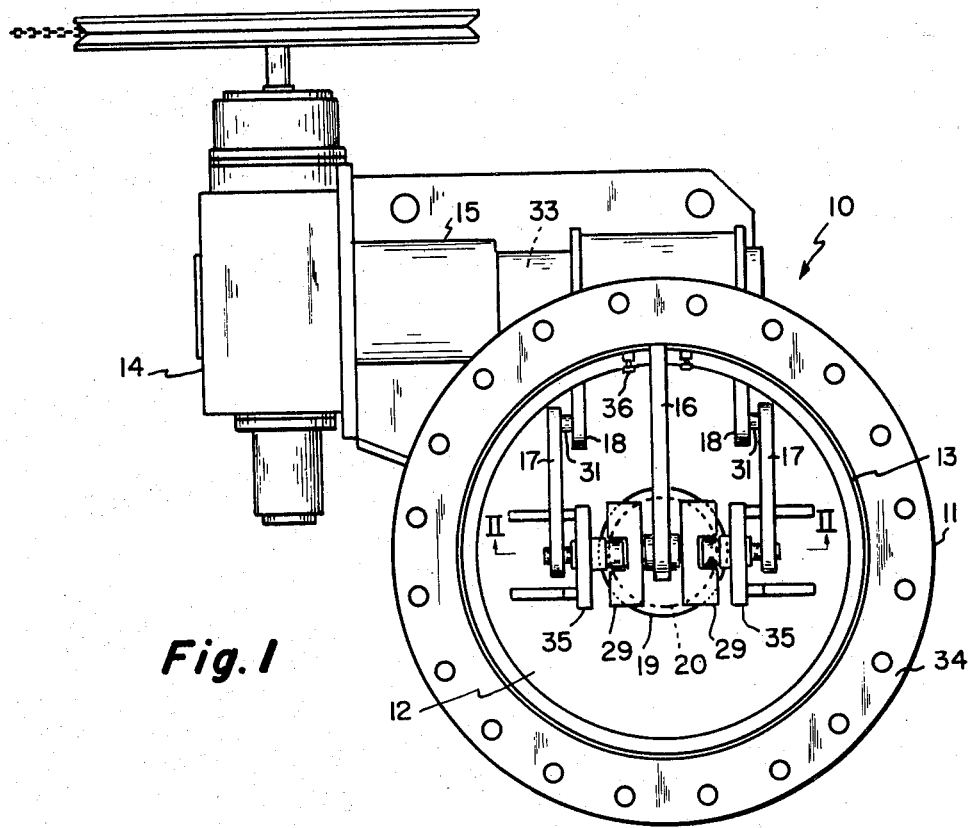
FIG. 1 is an elevation of our three lever valve.

The valve, generally designated 10, includes a valve body 11 having an opening therethrough. An annular valve seat 13 is formed about the opening and accommodates a valve disc 12. A valve operator 14 is positioned external of the valve 10. The drive shaft 33 from the valve operator is contained within valve shaft housing 15 and extends at right angles to the longitudinal axis of the valve body 11. The valve disc 12 is operated by the valve operator 14 through a central lever 16 which is keyed onto the shaft 33. End links 17 are connected to the valve body through link mounts 18 and pins 31. These end links are connected at their distal end to the valve disc 12 in a manner described hereinafter and the central lever 16 and the two end links 17 form the control arms which determine the sweep of the valve disc 12. The valve body 11 includes the standard annular flange 34 which mounts to the carrier for the gaseous media, FIG. 1.

Figure 2:
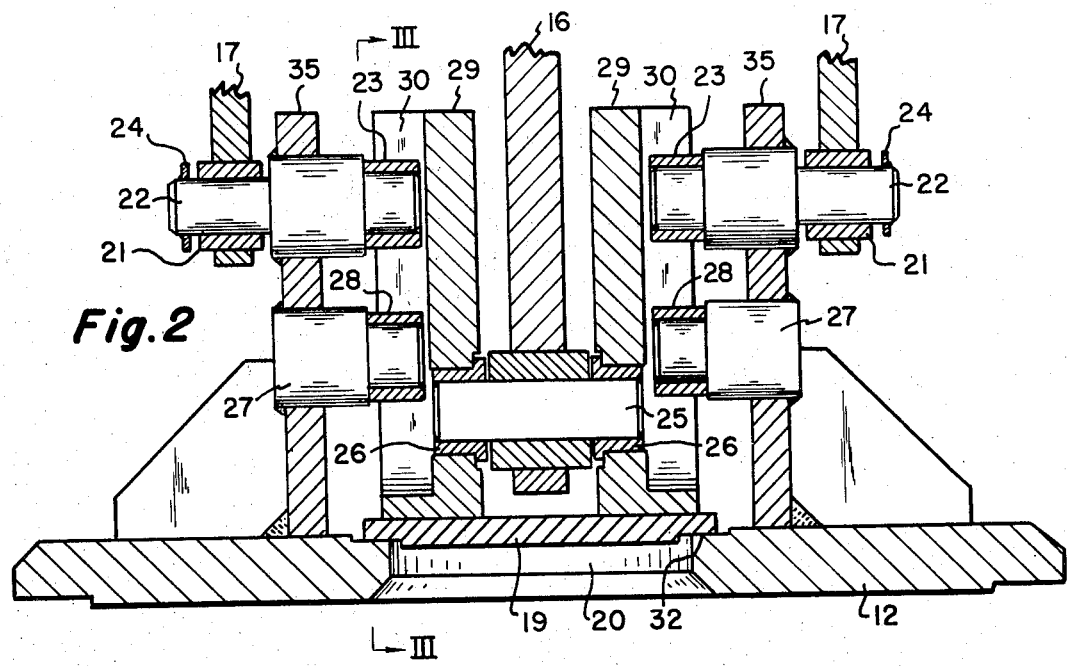
FIG. 2 is a section taken along section lines II—II of FIG. 1.

Our improvement is a relief port built into the valve disc 12 and operable by the central lever 16 of the above explained three lever valve 10. Specifically, the valve disc 12 includes a relief port 20 extending therethrough along the longitudinal axis of the valve body 11. The relief port 20 is shouldered so as to form a relief port valve seat 32 which accommodates a relief disc 19. Relief disc 19 is welded to two spaced relief disc uprights 29 which accommodate the central lever 16. Central lever 16 pivotably mounts to relief disc uprights 29 through a lever pin 25 operable within a lever pin bushing 26, FIG. 2.

Spaced outwardly from the relief disc uprights 29 are two stanchions 35 welded to the valve disc 12. Mounted through aligned openings in each stanchion 35 are guide pins 27 retained by guide pin bushing 28 and link pins 22 retained by link pin bushings 23. The link pins 22 also extend through a bushing 21 in the end links 17 to thereby pivotably mount the end link to the stanchion 35. Link pins 22 are retained in place by retainer washers 24, FIG. 2.

Figure 3:
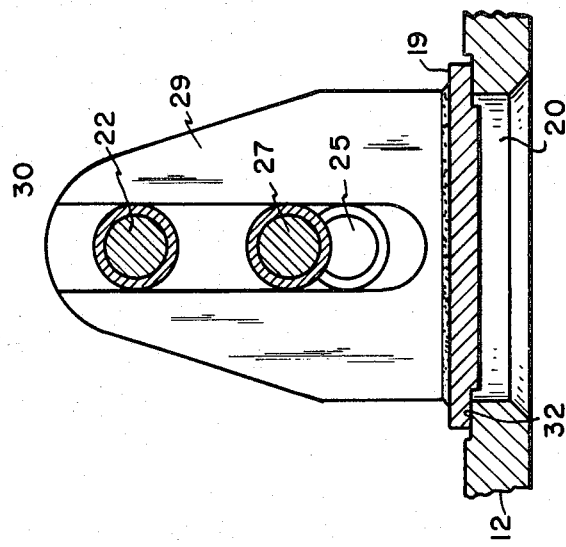
FIG. 3 is a section taken along section lines III—III of FIG. 2.

Each relief disc upright 29 includes a blind slot 30 which accommodates guide pin 27 and link pin 22. The stroke of the relief disc 19 is determined by the distance between the blind end of slot 30 and guide pin 27, which engages the blind end of slot 30 as will be described hereinafter, FIGS. 2 and 3.

Figure 6:
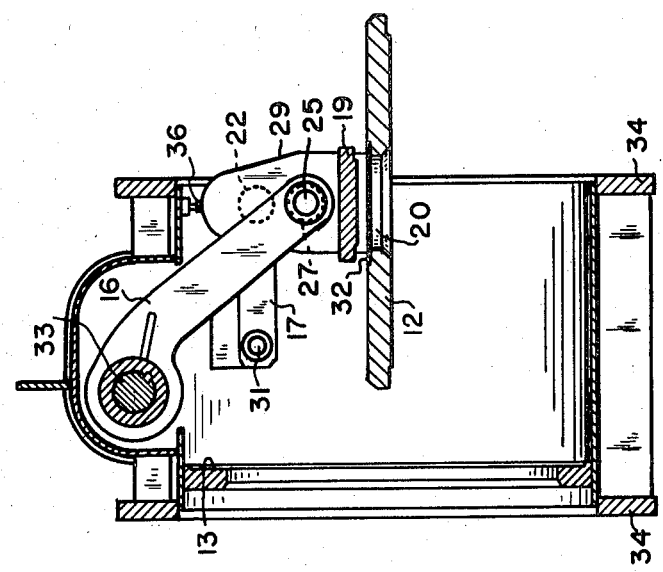
FIG. 6 is a section showing the valve open.
Figure 5:
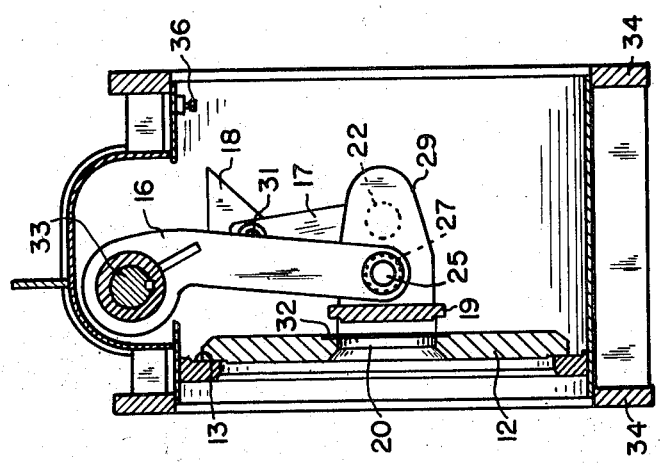
FIG. 5 is a section showing the relief port open and the valve closed.
Figure 4:
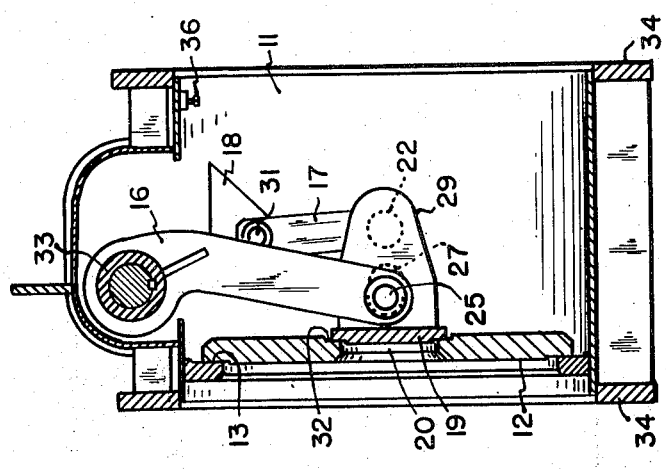
FIG. 4 is a section showing the relief port closed.
Figure 9:
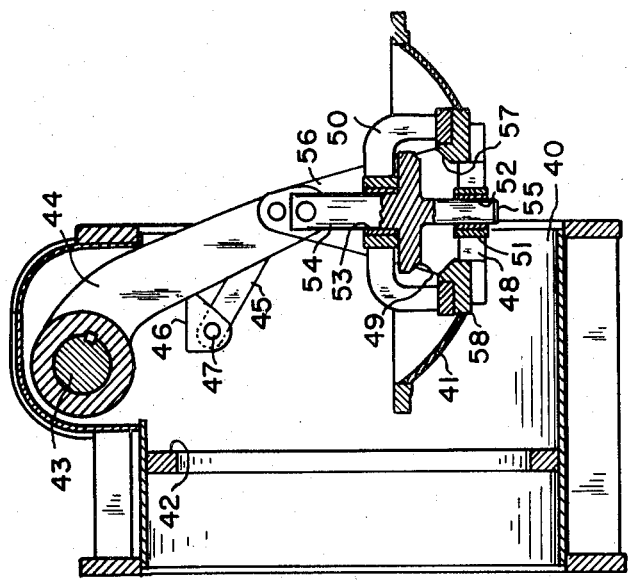
FIG. 9 is a section showing the relief port of FIG. 7 in which the valve is open.
Figure 8:
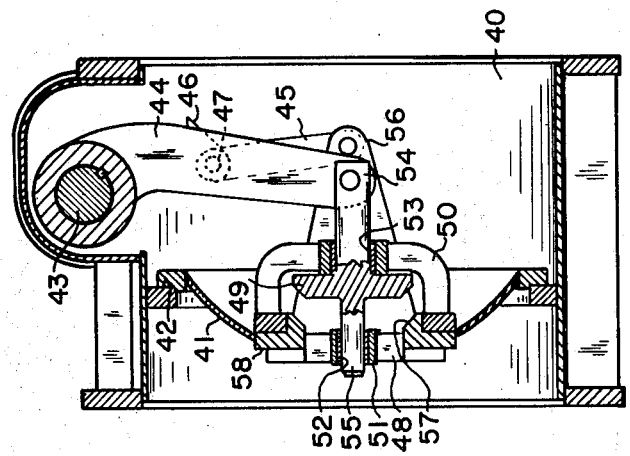
FIG. 8 is a section showing the relief port of FIG. 7 open and the valve closed.
Figure 7:
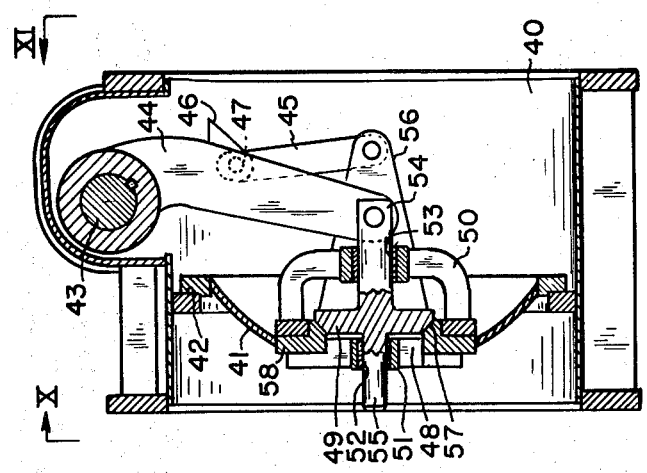
FIG. 7 is a section showing the relief port closed by a modified closure means.
Figure 11:
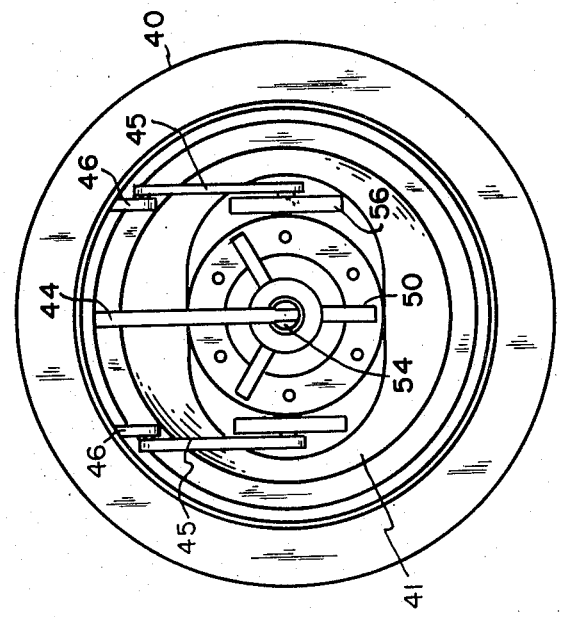
FIG. 11 is a section taken along section lines XI—XI of FIG. 7.
Figure 10:
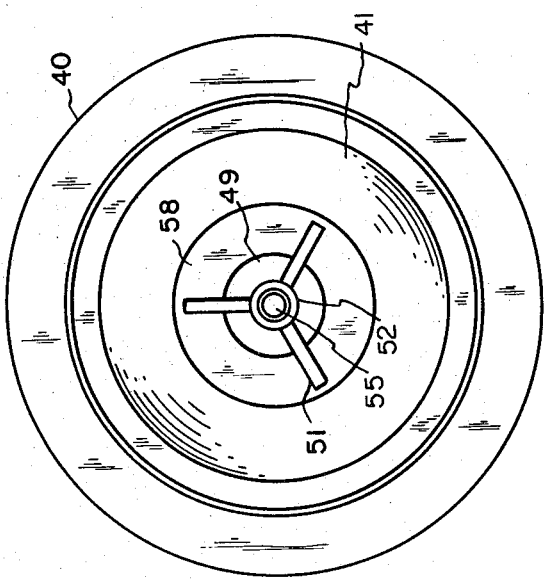
FIG. 10 is a section taken along section lines X—X of FIG. 7.

The operation of our three lever valve with relief port is as follows. In a closed position, the valve disc 12 rests on the valve seat 13 and the relief disc 19 rests on the relief port seat 32, FIG. 4. As the valve operator 14 rotates the shaft 33, the central lever 16, which is keyed thereto, rotates to move the relief disc 19 off of the relief port seat 32, thereby permitting the pressure to equalize across the valve disc 12. The relief disc moves freely until the blind end of slot 32 engages guide pins 27 at which time the entire valve disc 12 parallel moves off of the valve seat 13 for a short distance, FIG. 5. The end links 17 then act as control arms to rotate the entire disc 12 90° to an open position, FIG. 6. The disc rotation is stopped at 90° by means of a stop 36 extending downwardly into the opening formed by the valve body 11, FIGS. 4-6.

Another embodiment is illustrated in FIGS. 7-11. The valve body 40 contains a central opening therethrough which is shouldered to form valve seat 42. A valve disc 41 cooperates with the valve seat 42 as in the earlier embodiment. Valve disc 41 is dome-shaped, but it could also be flat as in the earlier embodiment. A valve operator (not shown) drives shaft 43 which connects to central lever 44. Central lever 44 is pivotally mounted to a closure means to be described hereinafter. End links 45 connect to the valve body 40 through pins 47 and link mounts 46.

The valve disc 41 includes a relief port 48 positioned along the longitudinal center line of the valve body 40. Relief port 48 is perimetrically defined by shoulder element 58 which also forms relief port seat 57. A tripartite spider element 51 connects to shoulder element 58, is disposed within the relief port 48, and includes a central opening 52. A tripartite yoke 50 also is mounted to the shoulder element 58 and includes a central yoke opening 53 aligned with and spaced from the spider opening 52.

The closure means comprises a relief disc 49 having a rearward leg 54 which extends through the yoke opening 53 and pivotally mounts to the central lever 44. Relief disc 49 also includes a forwardly extending leg which extends through the spider opening 52 and is guided thereby as the relief disc 49 is moved in and out of engagement with the relief port seat 57.

The embodiment of FIGS. 7-11 operates as follows. As the central lever 44 is initially rotated along with shaft 43, the relief disc 49 is moved out of engagement with the relief port seat 57 thereby permitting pressure equalization across the valve disc 41. The rearward surface of relief disc 49 then engages the central portion of yoke 50 which defines the yoke opening 53 and since the yoke 50 is secured to the valve disc 41 through shoulder 58, the entire valve disc 41 parallel moves off of valve seat 42. End links 45 connect to the valve disc 41 through stanchions 56 and act to control the movement so as to cause the 90° rotation of the valve disc 41 after the valve disc 41 has been parallel moved off of the valve seat 42.

Figure 14:
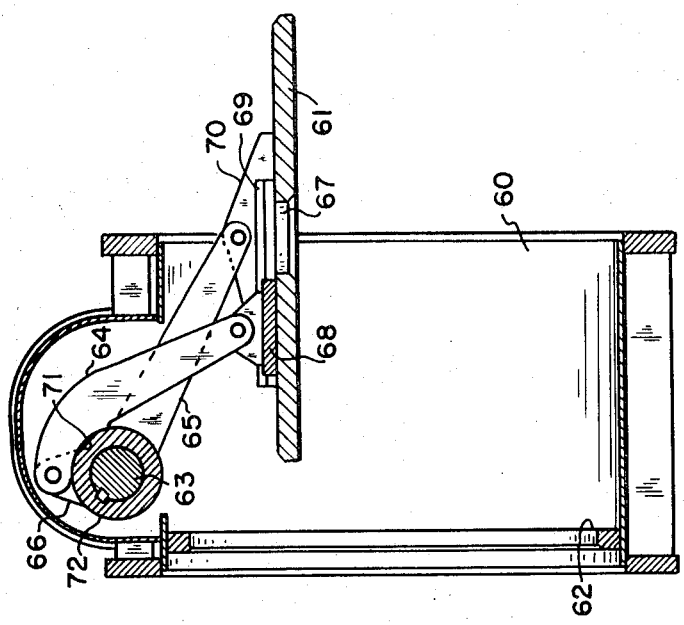
FIG. 14 shows the relief port of FIG. 12 in which the valve is open.
Figure 13:
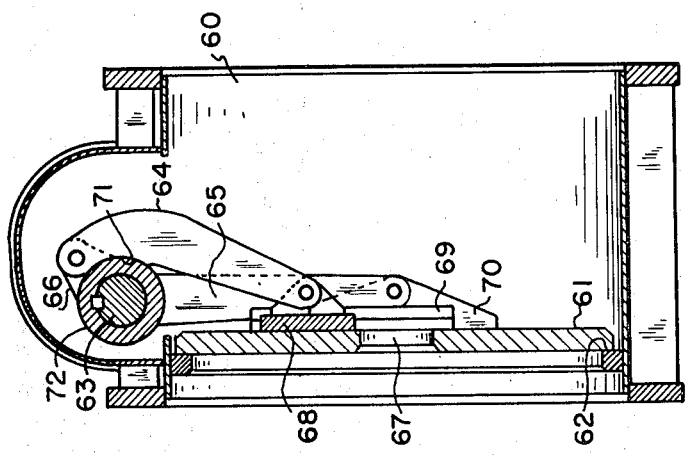
FIG. 13 shows the relief port of FIG. 12 open.
Figure 12:
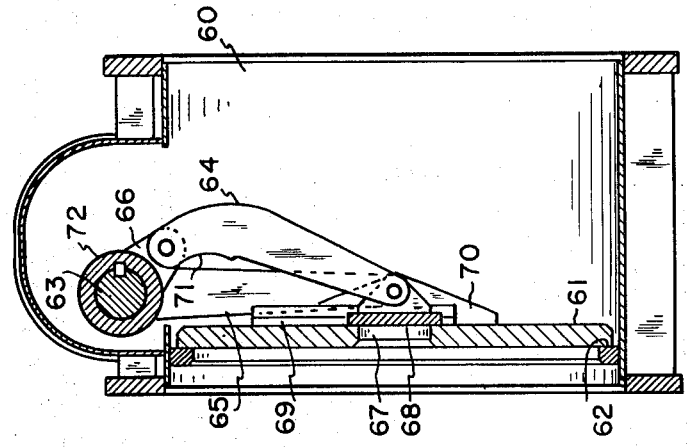
FIG. 12 is a section through a further embodied closure means for a relief port.

A still further embodiment is illustrated in FIGS. 12-14. Valve body 60 includes a central opening defined by valve seat 62 which cooperates with disc 61. Central lever 64 is mounted to a connecting link 66 which in turn connects with the operator driven shaft 63. Central lever 64 includes a notched section 71 which engages the shaft housing 72 during operation to create the necessary movement.

A relief port 67 extends through the disc 61 along the longitudinal center line of the valve body 60. Also mounted to the valve disc 61 is a slide track 69 which is in line with the relief port 67. The relief disc 68 is pivotally mounted to the central lever 64 and is positioned within the slide track 69 to move therealong.

As the shaft 63 begins to turn, the connecting link 66 and central lever 64 also rotate causing the relief disc 68 to move along the slide track 69 and out of mating engagement with the relief port 67, thereby opening relief port to equalize the pressure on either side of the valve disc 61. As the central lever continues to rotate, the notched section 71 engages the shaft housing 72 so that continued movement of the shaft 63 causes the parallel movement of the valve disc 61 off of the valve seat 62. The end links 65, which are pivotally connected to the valve disc 61 through stanchion 70, causes the valve disc to thereafter rotate through 90° to an open position as in the earlier embodiments.

Figure 15:
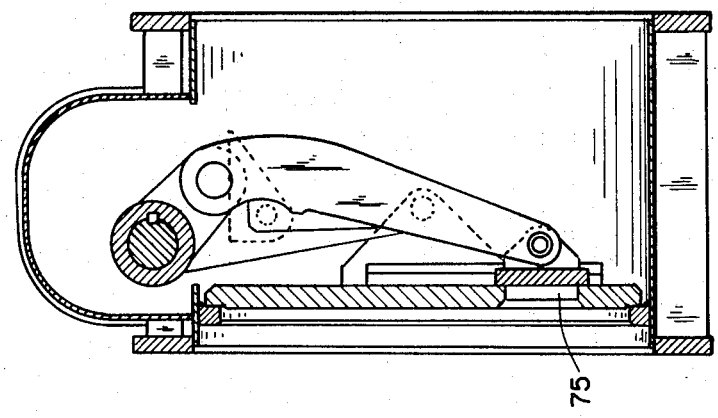
FIG. 15 shows still a further embodiment of a relief port closure means.

It is not necessary that the relief port be along the longitudinal center line of the valve body as illustrated in FIG. 15 by relief port 75 which is offset from the longitudinal center line of the valve body of the arrangement shown by FIGS. 12-14.

We claim:
1. A valve comprising:
   a. a valve body having a cylindrical opening therethrough;
   b. a valve seat positioned about the opening;
   c. a valve disc positioned within the opening for mating engagement with the valve seat, said valve disc having a relief port therethrough;
   d. two links and a motor driven central lever pivotably mounted so as to parallel move the valve disc away from the valve seat in a first movement and then rotate the disc through 90° to a fully open position;
   e. a guide yoke mounted to said disc, said yoke having a central passageway spaced from and aligned with the relief port;
   f. a centrally holed spider mounted within said relief port; and
   g. a closure member mounted on a shaft extending on opposite sides thereof, through the yoke's central passageway and through the central hole of the spider member and pivotally mounted to said central lever, said closure member adapted to engage a seat positioned about the relief port to close off the relief port and in an open position to engage the yoke to cause the first movement.

* * * * *

UNITED STATES PATENT AND TRADEMARK OFFICE
Certificate

Patent No. 3,870,079                   Patented March 11, 1975

Harry P. Finke, Hugh B. Carr and Carl D. Wilson

Application having been made by Harry P. Finke, Hugh B. Carr and Carl D. Wilson, the inventors named in the patent above identified, and Bloom Engineering Company, Inc., Pittsburgh, Pa., a corporation of Pennsylvania, the assignee, for the issuance of a certificate under the provisions of Title 35, Section 256, of the United States Code, deleting the name of Carl D. Wilson as a joint inventor, and a showing and proof of facts satisfying the requirements of the said section having been submitted, it is this 17th day of May 1977, certified that the name of the said Carl D. Wilson is hereby deleted to the said patent as a joint inventor with the said Harry P. Finke and Hugh B. Carr.

FRED W. SHERLING,
*Associate Solicitor.*